April 25, 1933.  W. B. LASKEY  1,906,069
METHOD OF AND MACHINE FOR PRODUCING CANDY UNITS
Filed March 27, 1929  7 Sheets-Sheet 1
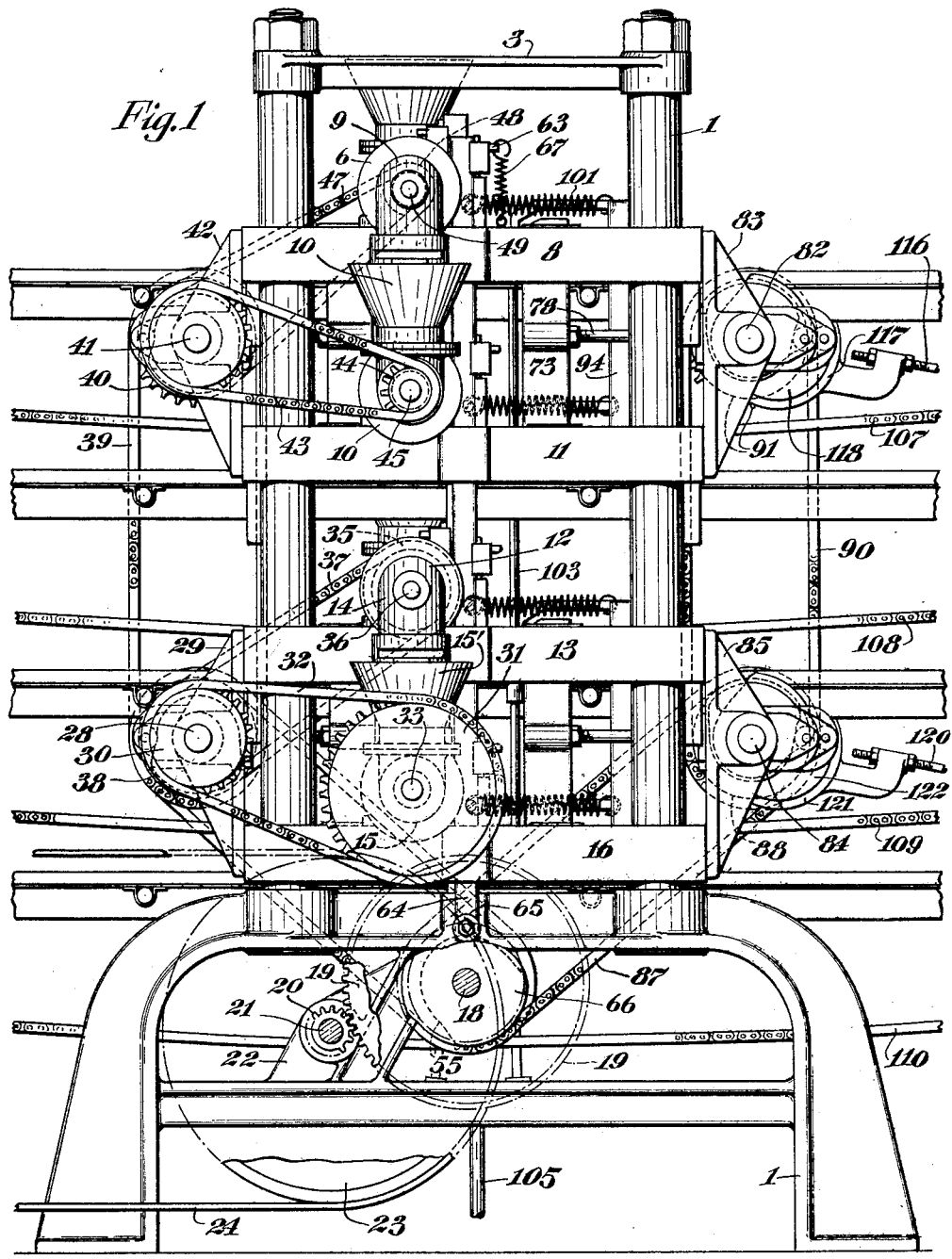

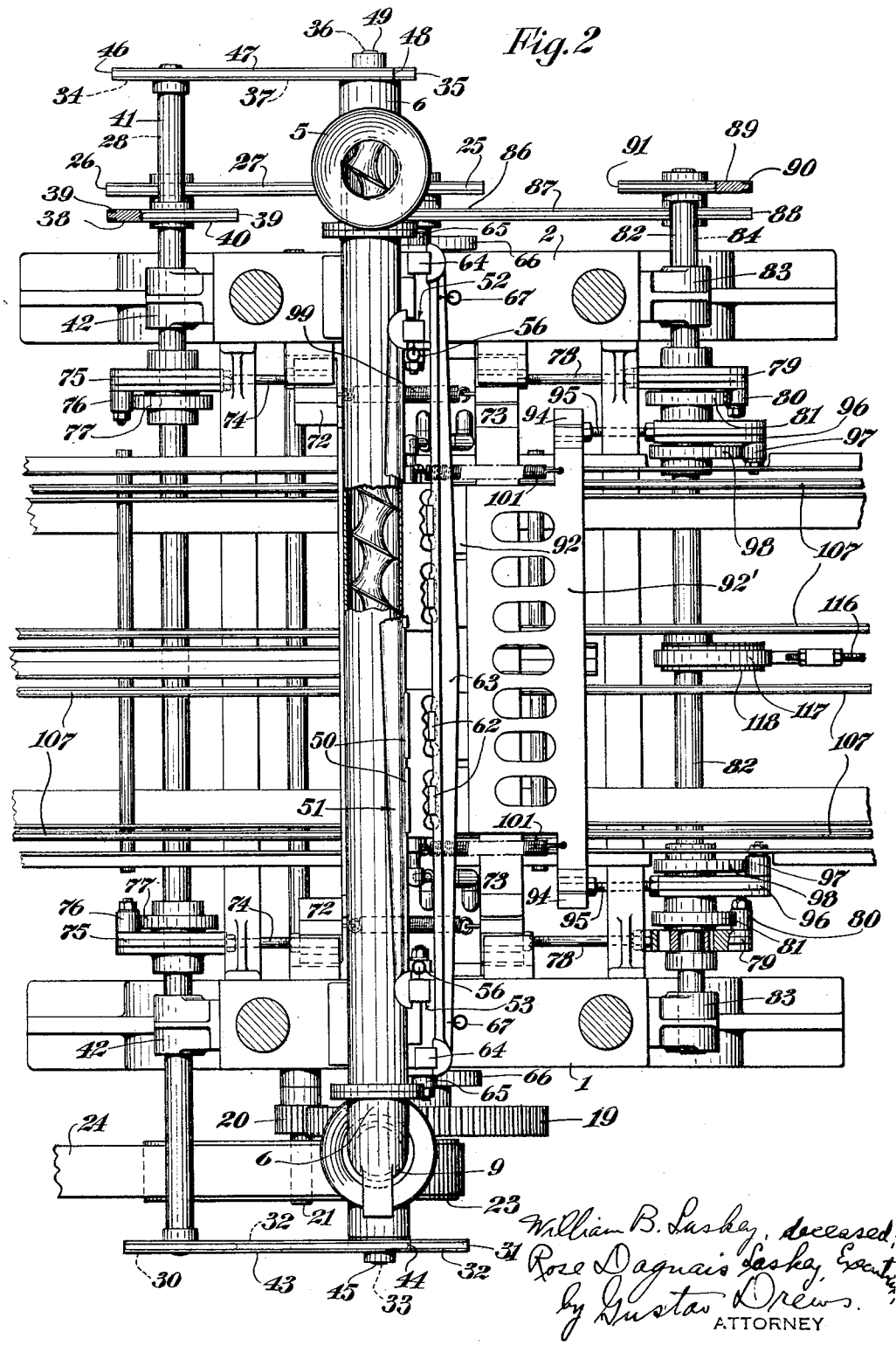

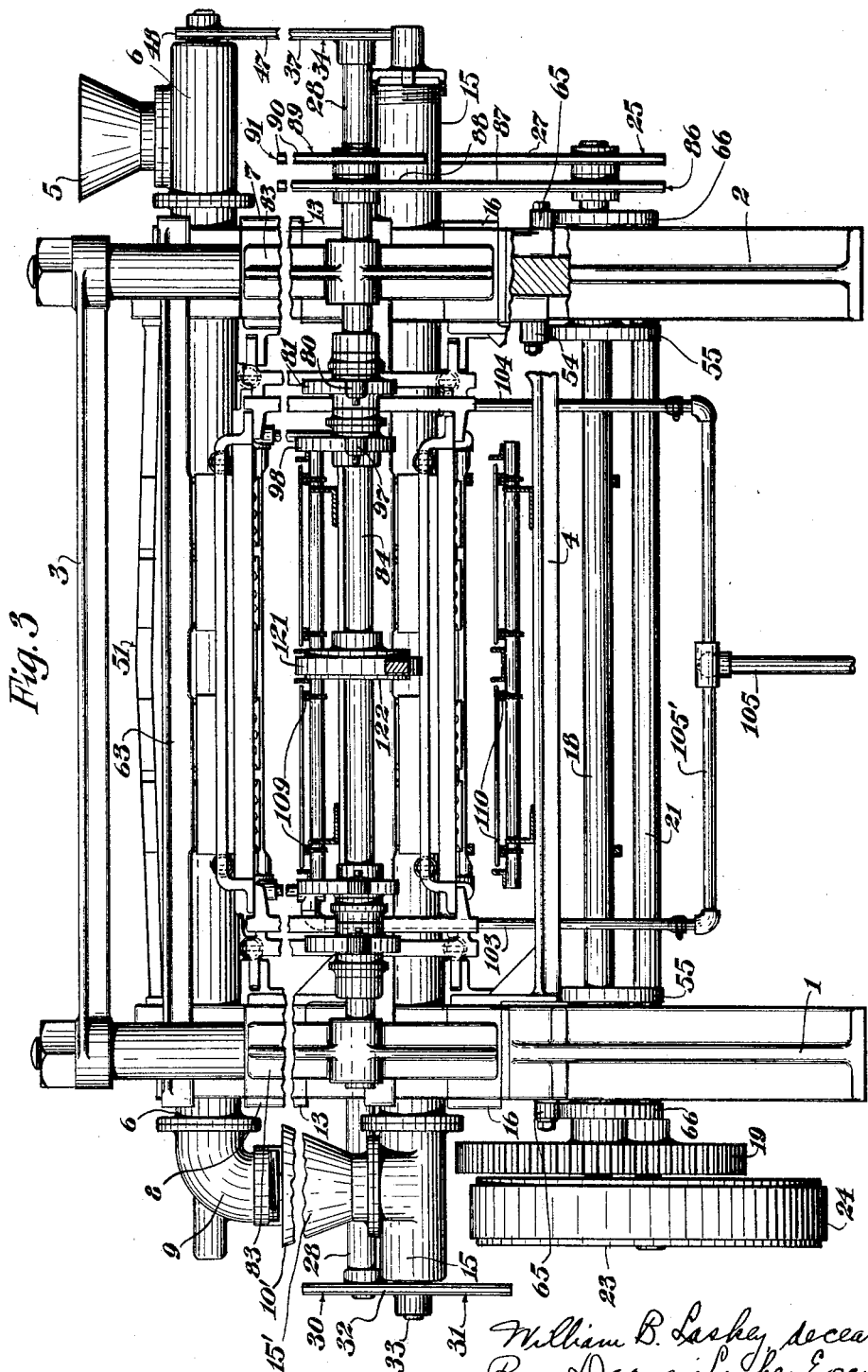

April 25, 1933.  W. B. LASKEY  1,906,069
METHOD OF AND MACHINE FOR PRODUCING CANDY UNITS
Filed March 27, 1929   7 Sheets-Sheet 4
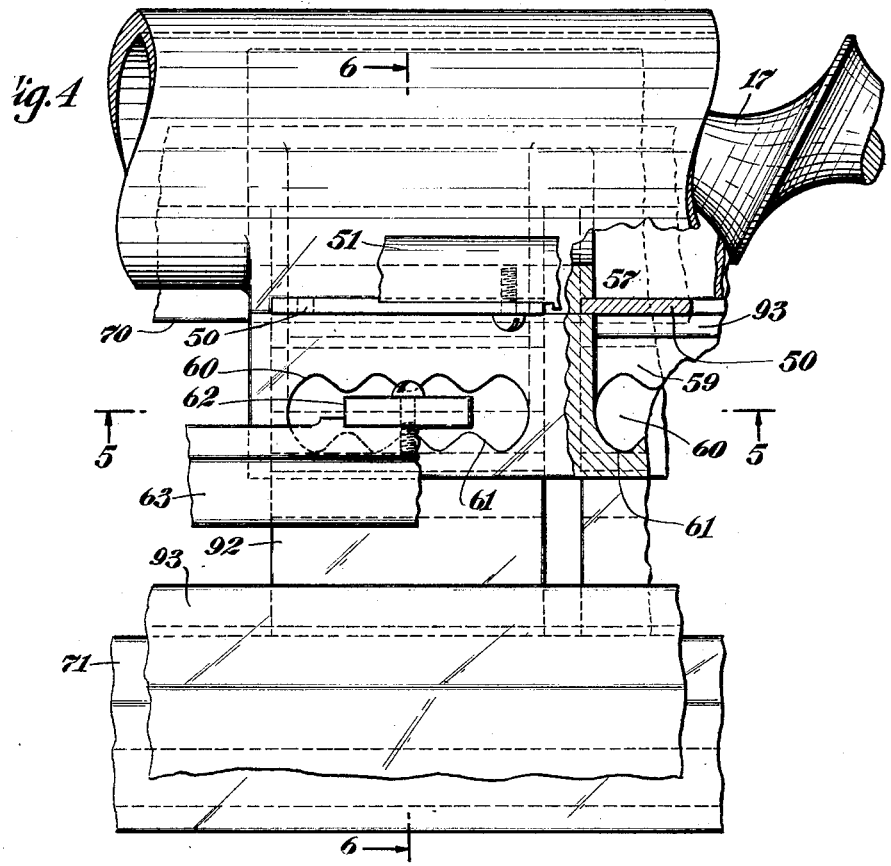
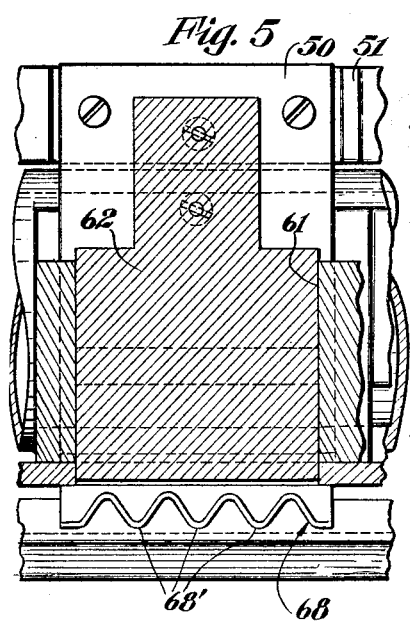
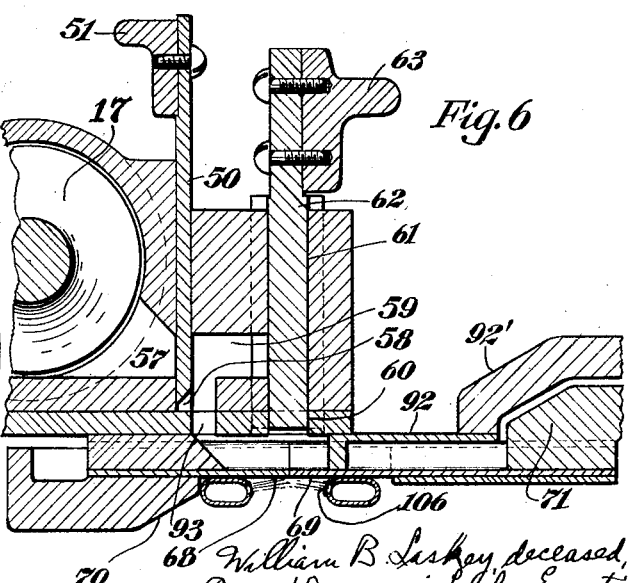
William B. Laskey deceased,
Rose Dagnais Laskey, Executrix,
by Gustav Drews
ATTORNEY April 25, 1933. W. B. LASKEY 1,906,069
METHOD OF AND MACHINE FOR PRODUCING CANDY UNITS
Filed March 27, 1929 7 Sheets-Sheet 5

April 25, 1933.  W. B. LASKEY  1,906,069
METHOD OF AND MACHINE FOR PRODUCING CANDY UNITS
Filed March 27, 1929   7 Sheets-Sheet 6
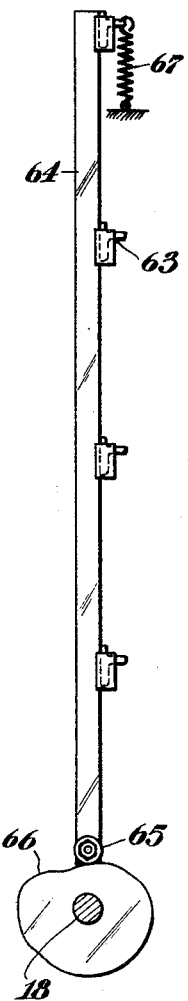
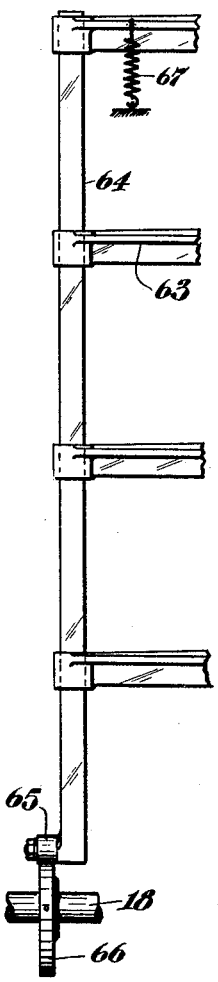
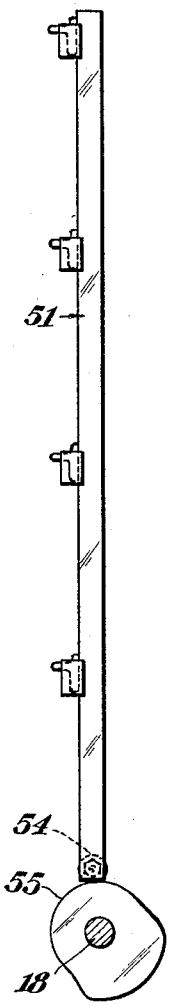
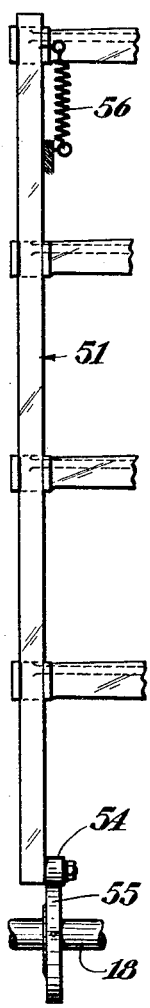
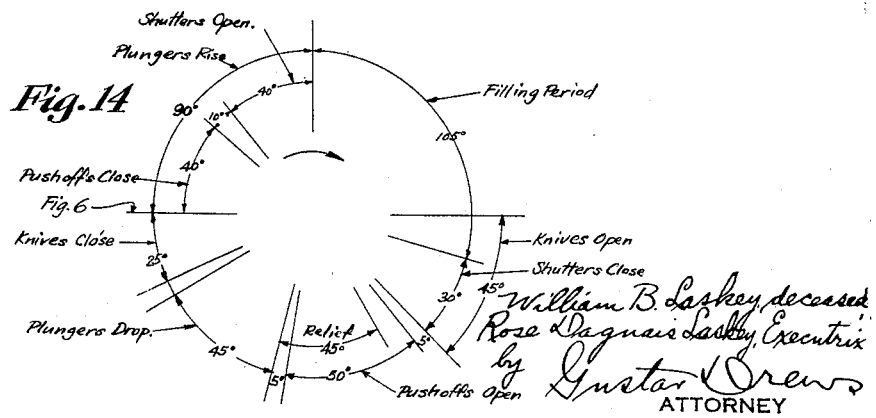

April 25, 1933. W. B. LASKEY 1,906,069
METHOD OF AND MACHINE FOR PRODUCING CANDY UNITS
Filed March 27, 1929  7 Sheets-Sheet 7
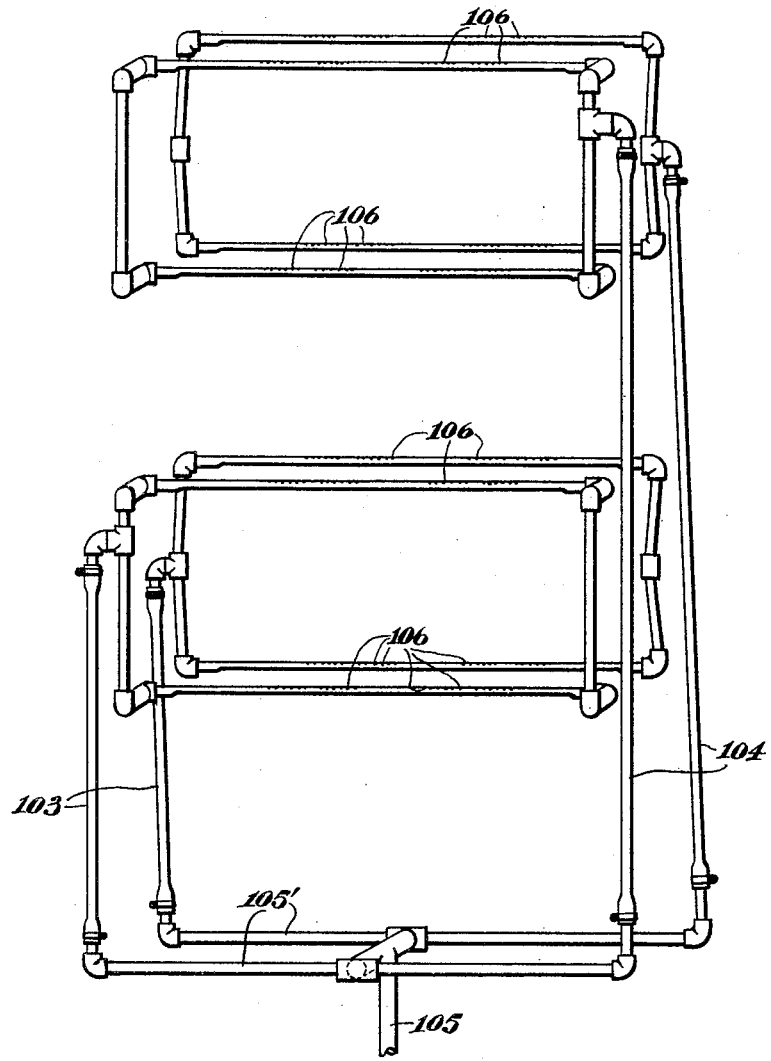

Patented Apr. 25, 1933

1,906,069

UNITED STATES PATENT OFFICE

WILLIAM B. LASKEY, DECEASED, LATE OF BROOKLYN, NEW YORK, BY ROSE DAGNAIS LASKEY, EXECUTRIX, OF BROOKLYN, NEW YORK, ASSIGNOR TO MASON, AU & MAGENHEIMER CONFECTIONERY MANUFACTURING COMPANY, OF BROOKLYN, NEW YORK, A CORPORATION OF WEST VIRGINIA

METHOD OF AND MACHINE FOR PRODUCING CANDY UNITS

Application filed March 27, 1929. Serial No. 350,179.

This invention relates to an improved method of, and machine for, producing candy centers composed of plastic material and the like.

In the manufacture of candy centers composed of a plastic material comprising a fondant and granular substances such as cocoanut particles and the like, when formed of ornamental shapes other than the standard rectangular shapes, it has been found desirable to extrude over-sized candy units and form at least part of the ornamental surface by removing the excess portion. In such machines it has also been desirable to extrude the over-sized units in a downward direction, in which case the excess portion was removed while the units were in suspended position. In such machines, it has been customary heretofore to use plungers to extrude the over-sized units and cause such plungers to operate through the main supply. To this end, the present invention aims to provide an improved mechanism whereby the over-sized units are first expelled in a lateral direction and the plungers thereupon caused to operate only upon such over-sized units and not through the main supply.

The present invention still further aims to provide an improved method of, and machine for, producing candy centers composed of plastic material in which a uniform pressure can be exercised upon an extensive area of plastic material so that a large number of discharge openings may be provided and the quantity discharged from each opening be predetermined within narrow limits, and the several units so discharged be substantially equal to one another. To this end, the present invention specifically contemplates a plurality of discharge openings, means for intermittently obstructing such discharge openings, and a screw conveyor for conveying the material to such discharge openings and creating a uniform pressure on the plastic mass adjacent each opening so that during the period of opening of such obstructing means, the units discharged from the several openings will be substantially equal to one another.

The present invention still further aims to provide a plurality of screw conveyors parallel to one another and a plurality of discharge openings for each screw conveyor, and conduits connecting one screw conveyor with the other in succession so that the several conveyors, when simultaneously operating, may operate as a single conveyor for supplying plastic material to the discharge openings.

These and other features, capabilities and advantages of the improved method and machine will appear from the subjoined detail description of one specific embodiment of the machine for carrying out such method, as illustrated in the accompanying drawings, in which Figure 1 is an end elevation of a machine made according to the present improvements, with parts broken away;

Fig. 2 is a plan view of a machine made according to the present improvements, with parts broken away;

Fig. 3 is a front elevation of a machine made according to the present improvements, with parts broken away;

Fig. 4 is an enlarged fragmental detail showing one of the discharge outlets;

Fig. 5 is a section on the line 5—5 of Fig. 4;

Fig. 6 is a section on the line 6—6 of Fig. 4;

Fig. 10 is a fragmental end elevation of plunger bracket with associated cam connections detached;

Fig. 11 is a fragmental front elevation of plunger bracket with associated cam connections detached;

Fig. 12 is a fragmental end elevation of shutter bracket with associated cam connections detached;

Fig. 13 is a fragmental front elevation of shutter bracket with associated cam connections detached;

Fig. 14 is a time chart of the several operating elements; and

Fig. 15 is a front isometric view of the steam pipe system.

Figure 7:
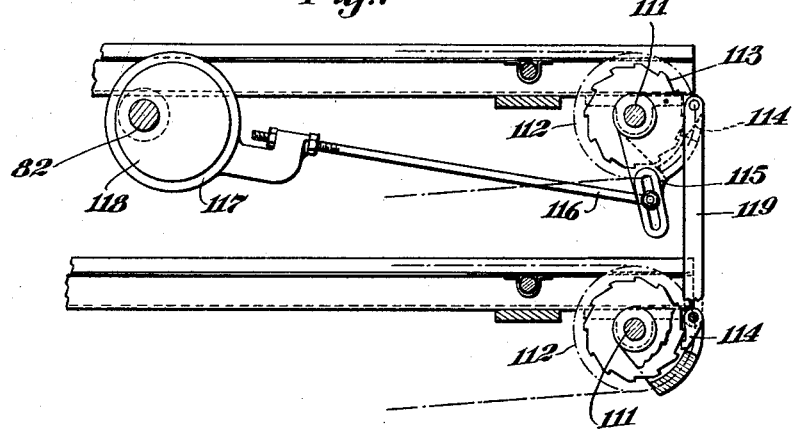
Fig. 7 is a fragmental end elevation, partly in section, showing the mechanism for controlling the conveyor.
Figure 8:
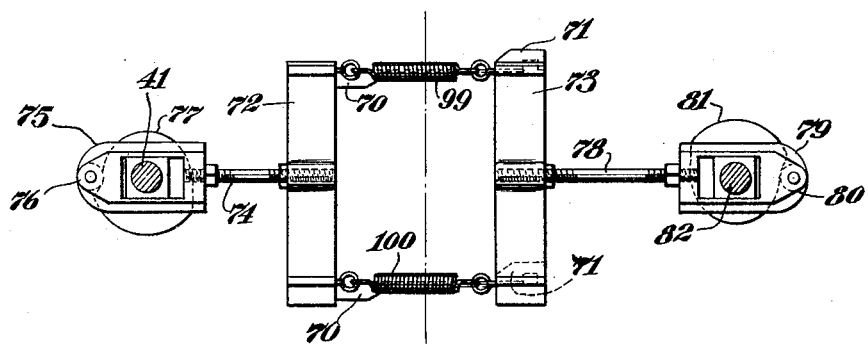
Fig. 8 is a fragmental end elevation showing the modified brackets and associated cam connections detached.
Figure 9:
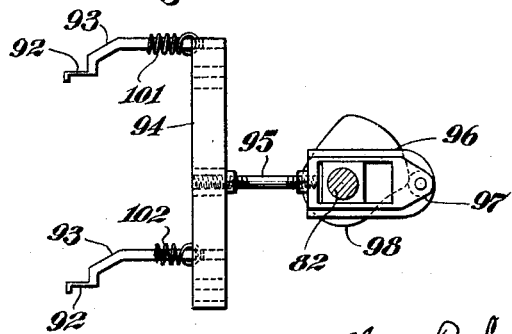
Fig. 9 is a fragmental end elevation of push-off and associated cam connections detached.

In the embodiment illustrated, there are provided two end frames 1 and 2 which are connected to one another at their upper ends by the transversely extending bracket 3 and connected at their lower ends by the transversely extending bracket 4.

In the present embodiment, there are provided a plurality of conduits or troughs parallel to one another and connected to one another for containing the candy mixture before being discharged into units, which conduits are provided with screw conveyors for advancing the candy mixture through such conveyors to create sufficient pressure in the mixture to facilitate its discharge at the time required and to advance the excess mixture from one conduit to the next succeeding conduit.

As shown in Fig. 3, at the right hand end of the frame 2, there is provided a funnel or receiving mouth 5 connected to the conduit 6 which is supported on the cross bars 7 and 8 connected to the end frames 2 and 1 respectively. At the left hand end of the frame 1, the conduit 6 is provided with an elbow 9 which registers with the funnel shaped mouth 10′ of the conduit 10, which is connected on the cross bars 11, 11 connected to the end frames 1 and 2 respectively, the cross bar 11 formed on the frame 2 not being shown.

The conduit 10 in turn is provided at the right hand end of the frame 3 with an elbow similar to the elbow 9, registering with the open end of the lower conduit 12 which is mounted on the cross bars 13, 13 connected to the end frames 2 and 1 respectively, which conduit 12 in turn is provided with an elbow 14 which registers with the funnel shaped end 15′ of the next succeeding lower conduit 15 which is supported on the cross bars 16, 16 connected to the end frames 1 and 2 respectively. The conduit 15 at its end to the right of the end frame 2, is open, as shown in Fig. 3. The conduits 6, 10, 12 and 15, as shown in Fig. 1, are substantially parallel to one another, one above the other, and each is provided with a screw conveyor 17, see Fig. 4.

The screw conveyor 17 in the conduit 6 serves two purposes, that is, to cooperate with the material therein to create sufficient pressure to cause the discharge of the required amount of material upon the opening of the discharge outlets associated with the conduit 6 and to constantly advance some of the material from the conduit 6 into the conduit 10. The screw conveyors 17 in the conduits 10 and 12 will operate similar to the screw conveyor 17 in the conduit 6. The pressure is so regulated that the screw conveyor 17 in the conduit 15 will merely serve to create sufficient pressure to cause the required amount of material to be discharged upon the opening of the discharge outlets associated with the conduit 15.

For operating the screw conveyors 17, the several screw conveyors are connected to the drive shaft 18. The drive shaft 18, as shown in Fig. 3, is provided with a suitable gear 19 which meshes with the spur gear 20 on the shaft 21 mounted in the brackets 22 of the end frames 1 and 2, the bracket 22 of the end frame 2 not being shown. The shaft 21 has mounted thereon a pulley 23 which is connected to a suitable source of power by the belt 24. The shaft 18 has mounted thereon a sprocket wheel 25 which is connected to the sprocket wheel 26 by the sprocket chain 27. The sprocket wheel 26 is mounted on the shaft 28 connected in the end brackets 29, 29 secured to the rear ends of the cross bars 13 and 16 respectively.

The end of the shaft 28, to the left of the end frame 1, has formed thereon a sprocket wheel 30 which is connected to the sprocket wheel 31 by the sprocket chain 32, the sprocket wheel 31 being mounted on the shaft 33 of the screw conveyor 17 in the lowermost conduit 15. The shaft 28 is also provided with a sprocket wheel 34 to the right of end frame 2 which is connected to the sprocket wheel 35 on the shaft 36 by the sprocket chain 37. The shaft 36, see Fig. 1, is connected to the conveyor 17 in the conduit 12. The shaft 28 is provided with a second sprocket wheel 38 which is connected by the sprocket chain 39 with the sprocket wheel 40 on the shaft 41 which is mounted in the end brackets 42, 42 connected to the cross bars 8 and 11 secured to the end frames 1 and 2. The shaft 41 is connected by the sprocket chain 43 with the sprocket wheel 44 on the shaft 45 associated with the screw conveyor 17 in the conduit 10. The shaft 41 has also fixed thereon a sprocket wheel 46 which is connected by the sprocket chain 47 with the sprocket wheel 48 on the shaft 49 of the screw conveyor 17 in the conduit 6.

While the sprocket wheels 40 and 38 are of the same size, it will be noticed that the sprocket wheel 44 is slightly larger than the sprocket wheel 48, that the sprocket wheel 35 is slightly larger than the sprocket wheel 44, and that the sprocket wheel 31 is considerably larger than the sprocket wheel 35. This relation is provided so that the succeeding conduits 10, 12 and 15 will successively have a decreased speed relative to conduit 6 so that sufficient pressures will be created in these conduits to form the functions required, it being understood, of course, that each preceding conduit will require a greater speed to take care of the decrease in pressure resulting from the intermittent discharge from the preceding conduit or conduits. Thus the screw conveyor 17 in the conduit 6 not only is required to create sufficient pressure to cause the mixture to discharge from the discharge openings in the conduit 6, but also to create sufficient pressure at the same time to advance its excess to the conduit 10, so that the conduit 10 will similarly have an excess to advance to the conduit 12 and the conduit 12 will have a sufficient excess to advance to the conduit 15, and similarly, the conveyor 17 in the conduit 10 must create sufficient pressure not only to cause the discharge of candy mixture during the opening of its discharge openings but also cooperate with the conduit 6 to advance the excess onto the conduits 12 and 15, and similarly the screw conveyor 17 in the conduit 12.

The discharge openings of the several conduits are caused to open at the same time. This is done by connecting the shutters 50 of the several conduits to a single bracket 51 which are reciprocably mounted in the recesses 52 and 53 formed in the cross bars 8, 11, 13 and 16 respectively on one side and 7, 11, 13 and 16 on the other side. The lower ends of the frame 51 are provided with cam rollers 54, see Figs. 12 and 13, which engage the cams 55 mounted on the shaft 18. The rollers 54 of the bracket 51 are maintained in engagement with the cams 55 by the springs 56 connecting the upper ends of the bracket 51 with the end frame members 1 and 2 respectively. There is a set of shutters 50 provided for each conduit 6, 10, 12 and 15 and, as shown in Fig. 6, they are slidable adjacent to the openings 57 formed at the lower sides of the conduits 6, 10, 12 and 15. The lower end of each shutter 50 is preferably provided with a knife edge 58 to facilitate severing the material when descending to shut off the openings 57.

In the present instance, each conduit 6, 10, 12 and 15 is provided with four openings 57. The openings 57 communicate by means of the openings 59 when the shutters 50 are raised with the die openings 60. The die openings 60, in the present instance, are shown as formed with a plurality of depressions to form an irregular shaped opening, see Fig. 4.

The die openings 60 are formed at the bottom of plunger passageways 61. In the plunger passageways 61, the plungers 62 are slidably mounted, a plunger 62 being provided for each die opening 60 and a row of plunger members 62 being provided for each conduit 6, 10, 12 and 15, the several rows of plunger members 62 being connected by the cross bars 63 to the plunger bracket 64 which is provided at its lower ends with the cam rollers 65 in engagement with the cams 66 mounted on the shaft 18. The cam rollers 65 of the bracket 64 are maintained in engagement with the cams 66 by means of the springs 67 connecting the upper end of the plunger bracket 64 with the end frame members 1 and 2 respectively.

To cooperate with the plunger members 62, there are provided cut-off knives and push-off members which cooperate with one another in a manner similar to that disclosed in the copending application, Serial No. 76,570 which issued as Patent No. 1,765,872. The cut-off knives operate in pairs, see the knives 68 and 69 in Fig. 6, which are caused to approach one another to cut off the units after they have been extruded by the plunger member 62 and then again caused to recede from one another preparatory to a succeeding extrusion.

In the present instance, a pair of cut-off knives 68 and 69 are provided for each row of openings 60, the cut-off knife 68 being mounted on the cross bar 70 and the cut-off knife 69 being mounted on the cross bar 71. In the present instance, furthermore, the cross bars 70 for the conduits 6 and 10 are connected to one another by end brackets 72 and the cross bars 71 for such conduits 6 and 10 are connected to one another by the cross bars 73 so that the cut-off knives for the conduits 6 and 10 may be operated by the same actuating means. Similarly, the cut-off knives 68 for the conduits 12 and 15 are connected to one another by similar end brackets 72, and the cut-off knives 69 for the conduits 12 and 15 are connected to one another by similar brackets 73 so that the cut-off knives for the conduits 12 and 15 may be actuated by the same actuating means.

The end members 72 for the conduits 6 and 10 are connected by the rods 74 with the cam brackets 75 which have rotatably mounted therein the cam rollers 76 which engage the cams 77 mounted on the shaft 41. The end members 73 for the conduits 6 and 10 are connected by the rods 78 with the cam brackets 79 which have mounted therein the cam rollers 80 in engagement with the cams 81 mounted on the shaft 82. The shaft 82 is mounted in the end brackets 83 connected to the front ends of the cross bars 8, 11 and 7, 11 respectively. Similarly, the cut-off knives 68 for the conduits 12 and 15 are connected to cam rollers 76 which engage cams 77 mounted on the shaft 28, whereas the cut-off knives 69 for the conduits 12 and 15 are provided with cam rollers 80 which engage cams 81 that are mounted on the shaft 84. The shaft 84 is mounted in the end brackets 85 secured to the front ends of the cross bars 13, 16 and 13, 16 respectively. The shafts 82 and 84 are drivingly connected to the shaft 18 in the manner now to be described.

The shaft 18 has formed thereon the sprocket wheel 86 which is connected by the sprocket chain 87 with the sprocket wheel 88 on the shaft 84, which shaft 84 has mounted thereon the sprocket wheel 89 which is connected by the sprocket chain 90 with the sprocket wheel 91 on the shaft 82.

The cut-off blades 68 and 69 are provided with a plurality of depressions 68', see Fig. 5, similar to the depressions formed in the cut-off knives of the copending application Serial No. 76,570 which issued as Patent No. 1,765,872, whereby the cut-off knives may be caused to form an ornamental upper surface on the units produced. In the present instance, push-off blades 92, similar to the push-off blades disclosed in the copending application Serial No. 76,570, are provided, which are slidably mounted on the upper surfaces of the cut-off knives 68 and 69 through the openings 93 into the passages 59. The push-off blades 92, in the present instance, are mounted on cross bars 92'. In the present instance, the push-off blades 92 for the conduits 6 and 10 are connected together to be actuated by the same actuating means, and similarly, the push-off blades 92 for the conduits 12 and 15 are connected to one another to be actuated by the same actuating means. To this end the cross bars 92' of a pair of push-off blades 92 are connected to one another by the end members 94 which are connected by the rods 95 with the cam brackets 96 provided with the cam rollers 97 in engagement with the cams 98 formed on the shaft 82 for the conduits 6 and 10 and formed on the shaft 84 for the conduits 12 and 15.

For maintaining the cam rollers 76 and 80 in engagement with the cams 77 and 81 respectively for the cut-off knives 68 and 69, there are provided two sets of springs 99 and 100, the springs 99 connecting the upper ends of the connecting members 72 and 73 with one another and the springs 100 connecting the lower ends of the connecting members 72 and 73 with one another. For maintaining the cam rollers 97 of the push-off blades in engagement with the cams 98, the springs 101 and 102 are provided, the springs 101 connecting the upper ends of the connecting bars 94 with the conduit 6, and the springs 102 connecting the lower ends of the connecting bars 94 with the conduit 10.

When the machine is used for a candy mixture consisting of a plastic mass composed of a cream fondant and granular substances such as cocoanut shreds, it is desirable to maintain the edges of the cut-off knives and push-off blades well supplied with water or steam. It has been found satisfactory to connect the cut-off knives with steam conduits which are connected by the flexible branch portions 103 and 104 to the branch portions 105' of the main steam supply conduit 105. The branches 103 and 104 are connected to the cut-off knives 68 and 69 to supply steam to the steam jets 106, see Fig. 6.

Beneath each row of openings 60 there are provided conveyor chains on which suitable candy receiving plates are mounted to receive the units as they are discharged. The conveyor chains are connected to advance intermittently after each discharge. There are four such sets of chains 107, 108, 109 and 110 provided, one set for each row of discharge openings 60. The shafts 111 at the front end of the machine on which the sprocket wheels 112 for the several conveyor chains are mounted are provided with ratchet wheels 113 cooperating with pawls 114. The pawls 114 of the uppermost ratchet wheel 113 is connected to the bracket 115 mounted on the uppermost shaft 111 which is connected by the link 116 with the eccentric ring 117 mounted on the eccentric 118 secured to the shaft 82. The pawl 114 of the second uppermost shaft 111 is connected by the link 119 with the pawl 114 of the uppermost shaft 111. Similarly, the shafts 111, 111 of the conveyor chains 109 and 110 are connected to one another and advanced by the link 120 with the eccentric ring 121 on the eccentric 122 secured to the shaft 84.

From the foregoing it will appear that a supply of candy mixture is introduced into the system through the mouth or funnel 5 and that this candy mixture is advanced by means of the screw conveyor 17 not only from one conduit to another but into the openings 57 where sufficient pressure will be created so that upon the ascent of the shutters 50 a predetermined amount of candy mixture will be fed into the passages 59 and from there into the die openings 60, that thereupon, the cut-off knives 68 and 69 will open, then the shutters 50 close, thereupon the push-blades 92 open, then the plunger members 62 descend to extrude the units selected or segregated in the die openings 60, thereupon the knives close to form the upper surface of the unit so extruded and collect the excess on the upper surfaces, thereupon the push-off blades close to remove the collected excess and return it through the openings 93 into the passages 59, and the plunger member 62 rises. After the push-off blades have closed, the shutters 50 open so that the plunger member 62, upon completing its ascent, may cooperate with the pressure in the system to suck a succeeding row of units into the die openings 60. While the cut-off knives 68 and 69 perform their severing operation, the conveyor chains 107, 108, 109 and 110 will be at rest and remain so until the units so severed have been received upon the plates carried by such conveyor chains, and immediately thereafter there will be imparted to the conveyor chains a predetermined advance sufficient to cause the units discharged to clear the path of movement of the next succeeding units to be discharged.

It is obvious that various changes and modifications may be made to the details of construction without departing from the general spirit of the invention as set forth in the appended claims.

What is claimed is:

1. The method of forming a plurality of candy units from a plastic candy mixture consisting in conveying the mixture along a path of movement that is folded upon itself to form a plurality of parallel paths of movement, exercising pressure on the mass so conveyed, discharging a plurality of rows of streams of mixture by the pressure so created in a lateral direction, and thereupon severing said streams into units.

2. In a machine of the class described, the combination with a plurality of parallel conduits connected in series, of means for creating pressure in said conduits to advance their contents from one to the other, there being openings in said conduits all facing in one direction, means for clearing said openings to permit the discharge of a plurality of streams of candy therethrough in one direction by the pressure created in said conduits, die openings for receiving portions of the streams so discharged, and plungers associated with one another for expelling the portions so received.

3. In a machine of the class described, the combination with a plurality of parallel conduits connected in series, of means for creating pressure in said conduits to advance their contents from one to the other, there being openings in said conduits all facing in one direction, means for clearing said openings to permit the discharge of a plurality of streams of candy therethrough in one direction by the pressure created in said conduits, die openings for receiving portions of the streams so discharged, plungers for expelling the portions so received, a plunger bracket for actuating said plungers, and cut-off knives for severing units from the portions so expelled.

4. In a machine of the class described, the combination with a plurality of conduits parallel to one another for containing a continuous mass of candy mixture, connections for connecting the successive conduits with one another, screw conveyors in said conduits for exercising pressure on the candy mixture and advancing it from one conduit to the succeeding conduit, there being openings in said conduits to form a plurality of parallel rows of openings all facing in the same direction, shutters for clearing said openings to permit the discharge of streams of candy from said openings by the pressure created, die openings for receiving portions of the streams so discharged, and plungers associated with one another for expelling the portions so received.

5. In a machine of the class described, the combination with a plurality of conduits parallel to one another for containing a candy mixture, connections for connecting the successive conduits with one another, screw conveyors in said conduits for exercising pressure on the candy mixture and advancing it from one conduit to the succeeding conduit, there being openings in said conduits to form a plurality of parallel rows of openings, shutters for clearing said openings to permit the discharge of streams of candy from said openings by the pressure created, die openings for receiving portions of the streams so discharged, plungers for expelling the portions so received, and cut-off knives for cutting off units of the portions so expelled.

6. In a machine of the class described, the combination with a plurality of conduits parallel to one another for containing a candy mixture, connections for connecting the successive conduits with one another, screw conveyors in said conduits for exercising pressure on the candy mixture and advancing it from one conduit to the succeeding conduit, there being openings in said conduits to form a plurality of parallel rows of openings, shutters for clearing said openings to permit the discharge of streams of candy from said openings by the pressure created, die openings for receiving portions of the streams so discharged, plungers for expelling the portions so received, cut-off knives for cutting off units of the portions so expelled, and push-off blades for removing the excess formed by the cut-off knives.

7. In a machine of the class described, the combination with a plurality of conduits parallel to one another for receiving a continuous mass of candy mixture, of connections connecting succeeding conduits with one another, means for creating pressure in said conduits, there being openings in said conduits all facing in the same direction, passage-forming means adjacent to said openings, shutters for clearing said openings to permit the discharge of streams of candy into said passage-forming means, die openings associated with said passage-forming means for receiving portions of the streams so discharged, and plungers associated with one another for expelling the portions so received.

8. In a machine of the class described, the combination with a plurality of conduits parallel to one another for receiving a candy mixture, of connections connecting succeeding conduits with one another, means for creating pressure in said conduits, there being openings in said conduits, passage-forming means adjacent to said openings, shutters for clearing said openings to permit the discharge of streams of candy into said passage-forming means, die openings associated with said passage-forming means for receiving portions of the streams so discharged, plungers for expelling the portions so received, there being return openings formed in said passage-forming means, cut-off knives for cutting off units from the portions so expelled, and push-off blades for returning the excess of said portions through said return openings to said passage-forming means.

9. In a machine of the class described, the combination with a plurality of conduits parallel to one another for receiving a continuous mass of candy mixture, of connections for connecting the successive conduits with one another, means for creating pressure in said conduits, there being openings in said conduits to form a plurality of parallel rows of openings all facing in the same direction, a shutter for each row of openings, a bracket connecting said shutters with one another, and means for actuating said bracket to cause said shutters to clear said openings to permit the discharge of a plurality of streams of candy mixture by the pressure created.

10. In a machine of the class described, the combination with a plurality of conduits parallel to one another for receiving a continuous mass of candy mixture of connections for connecting the successive conduits with one another, means for creating pressure in said conduits, there being openings in said conduits to form a plurality of parallel rows of openings, a shutter for each row of openings, a bracket connecting said shutters with one another, means for actuating said bracket to cause said shutters to clear said openings to permit the discharge of a plurality of streams of candy mixture by the pressure created, a row of die openings for each row of candy streams for receiving portions of the streams so discharged, a row of plungers for each row of die openings, a bracket connecting said rows of plungers with one another, and means for actuating said plunger bracket to expel the portions of candy received in said die openings.

11. In a machine of the class described, the combination with a plurality of conduits parallel to one another for receiving a continuous mass of candy mixture, of connections for connecting the successive conduits with one another, means for creating pressure in said conduits, there being openings in said conduits to form a plurality of parallel rows of openings, a shutter for each row of openings, a bracket connecting said shutters with one another, means for actuating said bracket to cause said shutters to clear said openings to permit the discharge of a plurality of streams of candy mixture by the pressure created, a row of die openings for each row of candy streams for receiving portions of the streams so discharged, a row of plungers for each parallel row of die openings, a bracket connecting said rows of plungers with one another, means for actuating said plunger bracket to expel the portions of candy received in said die openings, and a pair of cut-off knives for each row of candy streams for cutting off a row of candy units from each row of portions expelled by said plungers.

12. In a machine for forming a plurality of candy units from a candy mixture, the combination with a plurality of elongated, horizontal, parallel containers, of a single supplying hopper at one end of the uppermost container, a connection between the other end of said uppermost container and the adjacent end of the next lowermost container to continue the feed of candy mixture to said lowermost container, a connection between the other end of said next lowermost container and the adjacent end of the third lowermost container, said containers and the remaining containers being thus disposed parallel but connected in series, a feeding screw in each of said containers, the screw in the uppermost container positively feeding the candy mixture in a main stream from the hopper to its other end, the screw in the next lowermost container positively feeding the candy mixture in the opposite direction and the screws in the remaining containers feeding the candy mixture alternately in this manner in one direction and the next in the opposite direction so that one continuous elongated main stream of candy is formed in a plurality of connected containers with the hopper of the uppermost container as the single supply inlet, there being a plurality of lateral conduits communicating with the sides of said containers, the vanes of said screw conveyors being inclined to deflect the secondary streams positively through said conduits, means for segregating a portion of the advance end of each secondary stream into a unit, and means for downwardly discharging said units.

ROSE DAGNAIS LASKEY,
*Executrix of the Estate of William B. Laskey, Deceased.*